US005798694A

United States Patent [19]
Reber et al.

[11] Patent Number: 5,798,694
[45] Date of Patent: Aug. 25, 1998

[54] FOOD STORAGE APPARATUS AND METHODS AND SYSTEMS FOR MONITORING A FOOD ITEM

[75] Inventors: William L. Reber, Schaumburg, Ill.; Cary D. Perttunen, Shelby Township, Mich.

[73] Assignee: Motorola, Inc., Schaumburg, Ill.

[21] Appl. No.: 770,932

[22] Filed: Dec. 19, 1996

[51] Int. Cl.$^6$ ............................................. G08B 21/00
[52] U.S. Cl. ........................ 340/540; 340/529; 340/555; 340/693; 340/825.17; 374/104; 374/141
[58] Field of Search ........................ 340/540, 588, 340/584, 693, 602, 572, 529, 585, 825.06, 825.08, 825.17, 825.15, 825.36; 374/102, 141, 151, 210

[56] References Cited

U.S. PATENT DOCUMENTS

| | | | |
|---|---|---|---|
| 4,710,755 | 12/1987 | Gurney | 340/585 |
| 4,910,406 | 3/1990 | Craig et al. | 250/372 |
| 4,933,525 | 6/1990 | St. Phillips | 219/10.55 E |
| 5,180,598 | 1/1993 | Jozefowicz | 426/88 |
| 5,224,373 | 7/1993 | Williams et al. | 73/29.02 |
| 5,335,509 | 8/1994 | Namisniak et al. | 340/585 |
| 5,662,419 | 9/1997 | Lamagna | 374/102 |
| 5,711,160 | 1/1998 | Namisniak et al. | 340/585 |

OTHER PUBLICATIONS

Content from Web page from http://info.aes.purdue.edu/acs/safe/wrkbook 1.html, "Safe Food For the Hungry—II", pp. 1–10.

Content from Web page from http://www.mediacenter.de/consor_e/home_6.htm, "Smart Kitchen Equipment", pp. 1–2.

Content from Web page from http://www.toshiba.com/new/julpr 16a.htm, "1996 Toshiba/NSTA ExploraVision", p. 1.

Primary Examiner—Glen Swann
Attorney, Agent, or Firm—James E. Gauger; Douglas D. Fekete

[57] ABSTRACT

A food storage apparatus comprises a container (140) for containing a food item, and a cover (142) for covering an opening of the container (140). A first electrical component (144) is associated with the container (140). A second electrical component (146) is associated with the cover (142). The first electrical component (144) communicates with the second electrical component (146) to monitor the food item.

27 Claims, 5 Drawing Sheets

FOOD STORAGE APPARATUS AND METHODS AND SYSTEMS FOR MONITORING A FOOD ITEM

Related Applications

The present application is related to the following applications which are assigned to the same assignee as the present application:

(1) "Smart Laundry System and Methods Therefor", having Ser. No. 08/527,133, filed Sep. 12, 1995, now Pat. No. 5,715,555. (2) "Portable Fluid Disinfection Apparatus", having Ser. No. 08/770,774 filed Dec. 19, 1996, Docket Number MNE00497.

The subject matter of the above-identified related applications is hereby incorporated by reference into the disclosure of this application.

FIELD OF THE INVENTION

The present invention relates to methods and systems for monitoring a food item.

BACKGROUND OF THE INVENTION

A number of smart kitchen systems have been proposed to monitor food items. A first system includes a refrigerator with a built-in computer which scans the bar code on food packages. The computer formulates suggestions for meals and prints recipes based on the contents of the refrigerator. Further, the computer automatically forms shopping lists and checks the Internet for daily specials on groceries.

The task of manually scanning the bar code on each food package introduces additional labor to the process of loading and unloading the refrigerator. On occasion, more than one attempt may be required to successfully read a bar code on the food item, as may be witnessed from the use of bar code readers in supermarkets and department stores.

A second system utilizes a scannable label affixed to items to be identified. Items stored in a cupboard or a refrigerator are registered using the label and placed on a home inventory list. An item is scratched from the list when consumed or removed from the cupboard or the refrigerator. The inventory list is cross-referenced with a meeting calendar to form a shopping list.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

Figure 1:
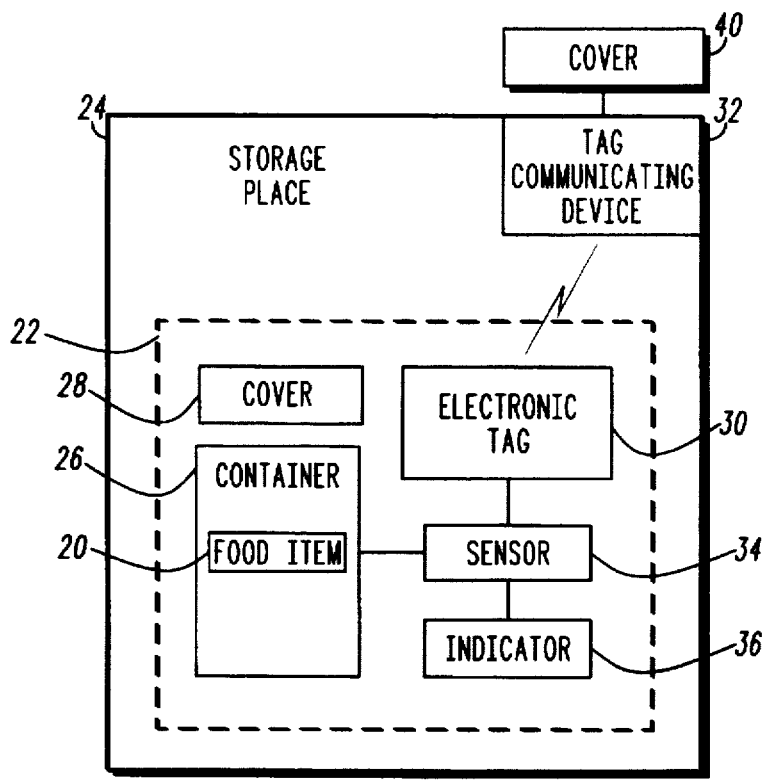
FIG. 1 is a block diagram of an embodiment of a system for storing and monitoring a food item.

FIG. 1 is a block diagram of an embodiment of a system for storing and monitoring a food item 20. The system includes a food storage apparatus 22 for containing the food item 20, and a storage place 24 for storing the food storage apparatus 22.

The food storage apparatus 22 includes a container 26 for containing the food item 20. The container 26 defines an opening through which the food item 20 can be placed therein and removed therefrom. The container 26 can be formed of one or more materials including, but not limited to, glass, plastic, ceramic, paperboard, and metal.

Optionally, the food storage apparatus 22 includes a cover 28 to cover the opening of the container 26.

The cover 28 can have the form of a cap or a lid which snaps on, screws on, or simply covers the opening of the container 26. The cover 28 may be used to secure the food item 20 within the container 26. When sealed, the container 26 and the cover 28 act to retard spoilage and retain the freshness of the food item 20. The cover 28 can be formed of one or more materials including, but not limited to, glass, plastic, ceramic, paperboard, and metal When sealed, the container 26 and the cover 28 can form an internal environment within the container 26 which is sealed from an external environment. Alternatively, at least one of the container 26 and the cover 28 can define one or more holes which allows air to flow between the internal environment and the external environment. The inclusion of one or more holes is beneficial for storing food items which need to breathe during storage, such as vegetables.

The container 26 and the cover 28 can be suited for storing and dispensing perishable food items, dry food items, liquid food items, or any combination thereof. Examples of perishable food items include, but are not limited to, fruit, vegetables, dairy items, eggs, meats, poultry, fish, baked food items, and combination dishes. Examples of dry food items include, but are not limited to, pasta, cereal, beans, rice, sugar, spices, chips, pretzels, nuts, drink mixes, and coffee. Examples of liquid food items include, but are not limited to, water, milk, fruit juice, vegetable juice, syrup, and salad dressing.

In a particular embodiment, the container 26 and the cover 28 have a form similar to various food storage containers which are presently available. Examples of such food storage containers include those available from Tupperware Corporation, Rubbermaid Corporation, Corning Incorporated, and Thermos Corporation. Generally, the container 26 and/or the cover 28 can be designed either for a single use or for multiple uses.

The container 26 is typically sized to facilitate carrying by an individual. Typically, the container 26 is sized to have a capacity of less than or equal to 10 liters.

As stated earlier, the inclusion of the cover 28 is optional in the food storage apparatus 22. If no cover is present, it is preferred that the container 26 be capable of providing a seal which secures the food item 20 therewithin and seals an internal environment from an external environment. In one embodiment, the container 26 has the form of a resealable storage bag, such as those produced by Dow Chemical Company under the brand name of Ziploc®.

In addition to storing the food storage apparatus 22, the storage place 24 can be utilized for storing other food storage apparatus, other food storage containers, and/or other food items. Generally, the storage place 24 can be provided by a refrigerator, a freezer, a compartment in a refrigerator or freezer, an oven, an appliance, a cabinet, a cupboard, a pantry, a room, or a transportation vehicle, for example.

The storage place 24 can be utilized to maintain the food item 20 within a predetermined range of temperature. For example, the storage place 24 can refrigerate the food item 20, freeze the food item 20, or heat the food item 20.

The storage place 24 can be utilized to provide a predetermined range of humidity for storing the food item 20. The predetermined range of humidity can be selected to maintain freshness of the food item 20.

The food storage apparatus 22 includes a:electronic tag 30. The electronic tag 30 communicates signals with a tag communicating device 32 to monitor at least one condition of the food item 20. Preferably, the electronic tag 30 is integrated with or attached to at least one of the container 26 and the cover 28.

It is preferred that the electronic tag 30 be hermetically sealed relative to water, water vapor, dishwashing solutions, and high and low temperatures so that the food storage apparatus 22 can be washed in an automatic dishwasher. Further, it is preferred that the electronic tag 30 be relatively small and flat so as to be unobtrusive when attached to or integrated with at least one of the container 26 and the cover 28. In accordance with these preferred specifications, the electronic tag can be constructed in accordance with a method of producing an environmentally sealed transponder disclosed in U.S. Pat. No. 5,420,757 issued to Eberhardt et al. and assigned to Indala Corporation. The Eberhardt et al. patent is hereby incorporated by reference into the disclosure of the present application.

Optionally, the food storage apparatus 22 further includes at least one sensor 34. The at least one sensor 34 senses at least one condition of the food item 20. The at least one sensor 34 can include a temperature sensor, a humidity sensor, a food quality sensor, an acidity sensor, and/or a biological sensor, for example.

The at least one sensor 34 communicates signals associated with the at least one condition to the electronic tag 30. The electronic tag 30, in turn, communicates signals associated with the at least one condition to the tag communicating device 32 and/or to an indicator 36 which is optionally included with the food storage apparatus 22.

The indicator 36 provides either an audible indication or a visual indication of a condition of the food item 20. To provide an audible indication, the indicator 36 can comprise an audio output device such as a speaker, a piezoelectric buzzer, or a transducer. To provide a visual indication, the indicator 36 can comprise a display element such as light-emitting diode (LED) display or a liquid crystal display (LCD).

The indicator 36 can provide an alert or a warning of the condition of the food item 20. For example, the alert may be generated if a measure of the condition is beyond a predetermined threshold. Alternatively, the indicator 36 can provide a numerical indication or a graphical indication indicative of a measure of the condition. Preferably, the indicator 36 is integrated with or attached to at least one of the container 26 and the cover 28.

Optionally, the tag communicating device 32 communicates with an indicator 40. As with the indicator 36, the indicator 40 can provide either an audible indication or a visual indication of a condition of the food item 20, a numerical indication or a graphical indication indicative of a measure of the condition, and/or an alert or a warning of the condition. The indicator 36 can further identify at least one of a plurality of food items within the storage place 24 for which the indication is generated.

Figure 2:
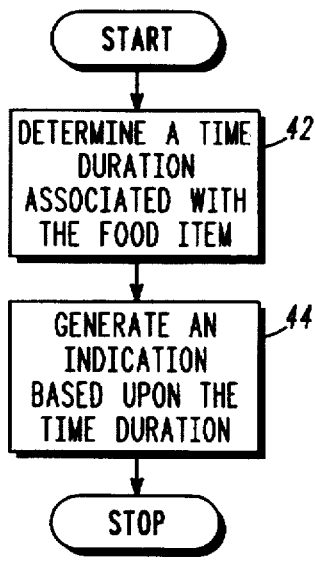
FIG. 2 is a flow chart of an embodiment of a method of monitoring a food item.

FIG. 2 is a flow chart of an embodiment of a method of monitoring a food item. As indicated by block 42, the method includes a step of determining a time duration associated with the food item. Two embodiments for determining a time duration associated with the food item are described with reference to FIGS. 3 and 4.

As indicated by block 44, the method further includes a step of generating an indication based upon the time duration. Regardless of how the time duration is defined and determined, the step of generating the indication can include generating an indication of measure of the time duration and/or generating an indication if the time duration is beyond a predetermined threshold. With reference to FIG. 1, the indication can be generated by either the indicator 36, the indicator 40, or both. In a preferred embodiment, the indication is utilized to alert an individual of a condition in which a food item requiring refrigeration should be discarded.

Figure 3:
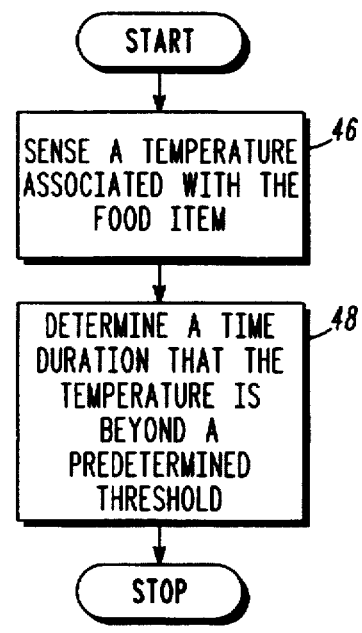
FIG. 3 is a flow chart of a first embodiment of a method of determining a time duration associated with a food item.

FIG. 3 is a flow chart of a first embodiment of a method of determining a time duration associated with a food item. As indicated by block 46, the method includes a step of sensing a temperature associated with the food item. The temperature can be sensed by a temperature sensor included in the at least one sensor 34 described with reference to FIG. 1. The temperature sensor senses a temperature proximate to the food item. Preferably, the temperature sensor senses a temperature at or near a surface of the food item.

As indicated by block 48, the method further includes a step of determining a time duration that the temperature associated with the food item is beyond a predetermined temperature threshold. The time duration can be determined using a processor associated with either the electronic tag 30 or the tag communicating device 32 described with reference to FIG. 1.

Many food items, such as milk, eggs, fresh meats, poultry, lunch meats, hot dogs, and mayonnaise, should be discarded if held above a predetermined temperature for more than a predetermined time duration. One rule of thumb for discarding food items is based upon a predetermined temperature of 40° F. and a predetermined time duration of 2 hours.

Using this rule of thumb, the temperature of the food item, preferably at a surface of the food item, is monitored to determine a time duration that the food item exceeds 40° F. The temperature can be monitored while the food storage apparatus is outside of the storage place, and/or while the food storage apparatus is within the storage place. An alert indication is generated if the time duration exceeds 2 hours.

It is noted that various predetermined temperatures and predetermined time durations can be utilized in embodiments of the present invention.

Figure 4:
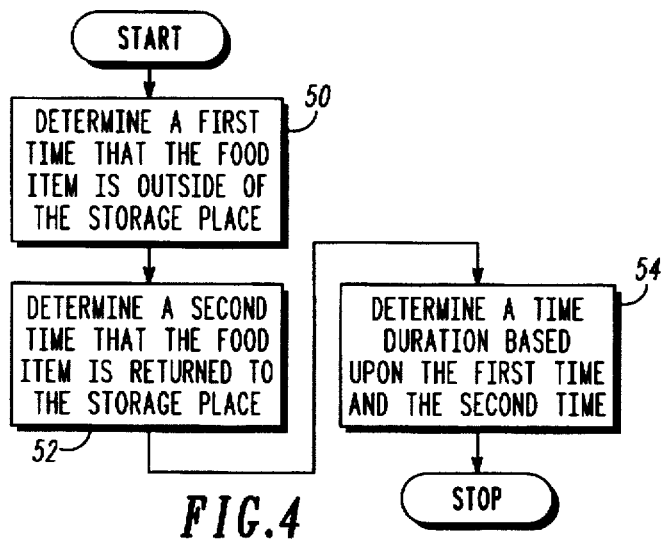
FIG. 4 is a flow chart of a second embodiment of a method of determining a time duration associated with a food item.

FIG. 4 is a flow chart of a second embodiment of a method of determining a time duration associated with the food item. This embodiment is utilized to determine a time duration that the food item is outside of a storage place. The storage place can include any example of the storage place 24 described with reference to FIG. 1. Of particular interest, however, is where the storage place is utilized to maintain the food item within a predetermined temperature range, such as within a refrigerator or a freezer.

As indicated by block 50, the method includes a step of determining a first time at which the food item is removed from the storage place. Using the system described with reference to FIG. 1, the first time is determined as follows. Prior to the first time, a step of establishing communication between the tag communicating device 32 and the electronic tag 30 is performed when the food item is within the storage place 24. Thereafter, a step of detecting a loss of communication between the tag communicating device 32 and the electronic tag 30 is performed when the food item is removed from the storage place 24. The first time is determined based upon a time at which the loss of communication is detected.

As indicated by block 52, the method includes a step of determining a second time at which the food item is returned to the storage place. With reference to FIG. 1, the second time is determined when communication is reestablished between the tag communicating device 32 and the electronic tag 30. Communication can be reestablished after the food item is returned to the storage place 24. The second time is determined based upon a time at which communication is reestablished.

As indicated by block 54, the method includes a step of determining the time duration based upon the first time and the second time. The time duration can be determined, for example, by determining a difference between the second time and the first time.

The second embodiment can be utilized to monitor for a discard condition of a food item when a temperature sensor is not included in the food storage apparatus 22. An alert indication can be generated if the time duration exceeds a predetermined time duration. Using the aforementioned rule of the thumb, the predetermined time duration can be selected to be about 2 hours.

Figure 5:
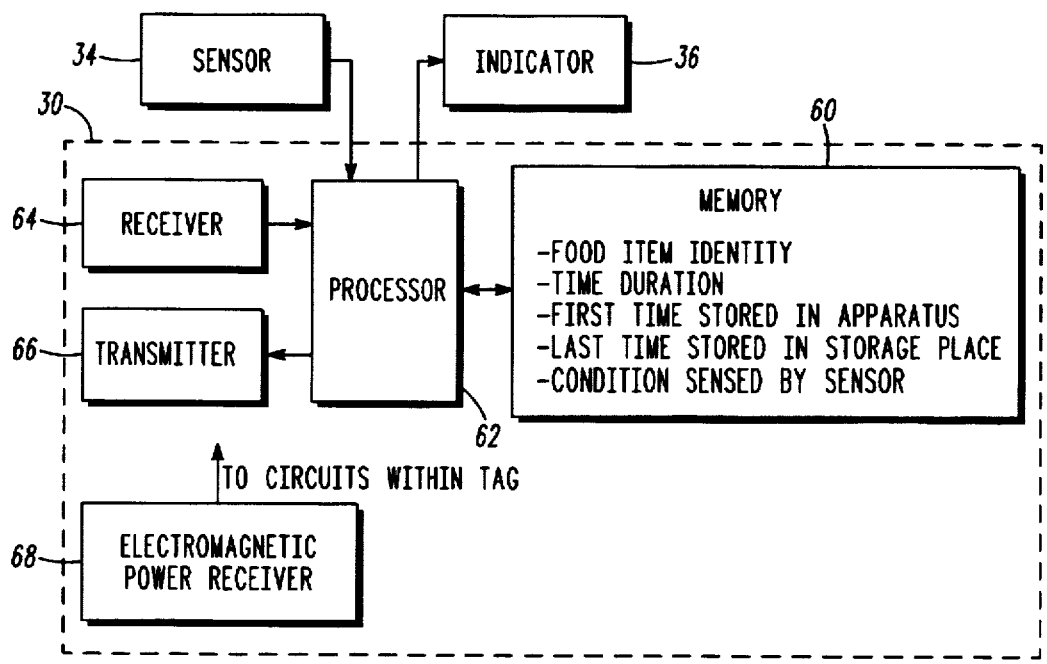
FIG. 5 is a block diagram of an embodiment of an electronic tag for use in embodiments of the present invention.

FIG. 5 is a block diagram of an embodiment of the electronic tag 30 for use in embodiments of the present invention. The electronic tag 30 includes a memory 60 which stores information for a food item. The information includes any of: (i) food Item identification information; (ii) a time duration, such as those described with reference to FIG. 2; (iii) a first time that the food item is placed within the food storage apparatus; (iv) a last time the food storage apparatus was within a storage place; and (v) conditions sensed by the at least one sensor 34. Examples of sensor-based information include, but are not limited to, a temperature proximate to the food item, a maximum temperature proximate to the food item over a time interval, a duration of time that the temperature proximate to the food item is beyond a predetermined temperature, an acidity of the food item, and a humidity within the food storage container. Preferably, the memory 60 is non-volatile so that the stored information is maintained without the application of power thereto.

A processor 62 executes a series of programmed steps to communicate information between the at least one sensor 34, the memory 60, and the tag communicating device 32. Further, the processor 62 communicates a signal to the indicator 36 to provide an indication of at least one condition of the food item. The processor 62 can be in the form of a microprocessor, a custom integrated circuit, a programmable logic array, or an application-specific integrated circuit, for example.

A receiver 64 is included to receive information transmitted from the tag communicating device 32. A transmitter 66 is provided to transmit information to the tag communicating device 32. Preferably, the receiver 64 and the transmitter 66 communicate the information using radio frequency signals.

Both the receiver 64 and the transmitter 66 are coupled to the processor 62 to communicate information with the memory 60. As a result, the transmitter 66 is operatively associated with the memory 60 to transmit information, such as a condition of the food item, for external reading.

The circuits within the electronic tag 56 are powered by an electromagnetic power receiver 68. The electromagnetic power receiver 68 receives electromagnetic power transmitted thereto, and converts the electromagnetic power to a DC signal or an AC signal to power components within the electronic tag (namely, the memory 60, the processor 62, the receiver 64, and the transmitter 66), to power the at least one sensor 34, and to power the indicator 36.

Figure 6:
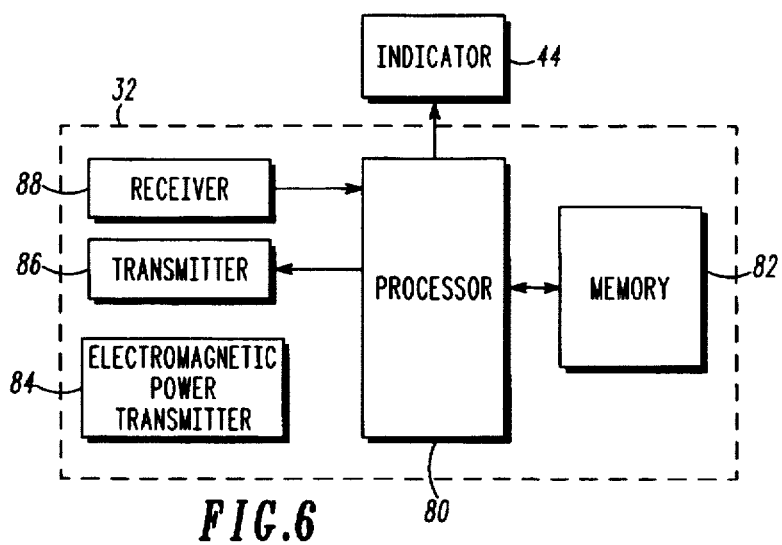
FIG. 6 is a block diagram of an embodiment of a tag communicating device for use in embodiments of the present invention.

FIG. 6 is a block diagram of an embodiment of the tag communicating device 32 for use in embodiments of the present invention. The tag communicating device 32 includes a processor 80 which executes a series of programmed steps to communicate information with the electronic tag 30 for monitoring a food item. As with the processor 62, the processor 80 can be in the form of a microprocessor, a custom integrated circuit, a programmable logic array, or an application-specific integrated circuit. The processor 80 communicates with a memory 82 for storing information communicated with the electronic tag 30.

The tag communicating device 32 includes an electromagnetic power transmitter 84 for transmitting an electromagnetic power signal to supply power to the components in the electronic tag 30. The electromagnetic power transmitter 84 is activated and deactivated in response to commands provided by the processor 80.

A transmitter 86 transmits information generated by the processor 80 and/or stored in the memory 82 for reception by the receiver 64 in the electronic tag 30. A receiver 88 receives information transmitted by the transmitter 66 in the electronic tag 30. The receiver 88 communicates the received information to the processor 80. The processor 80 processes the received information to selectively generate a signal for producing an indication using the indicator 36, the indicator 40, or both.

Figure 7:
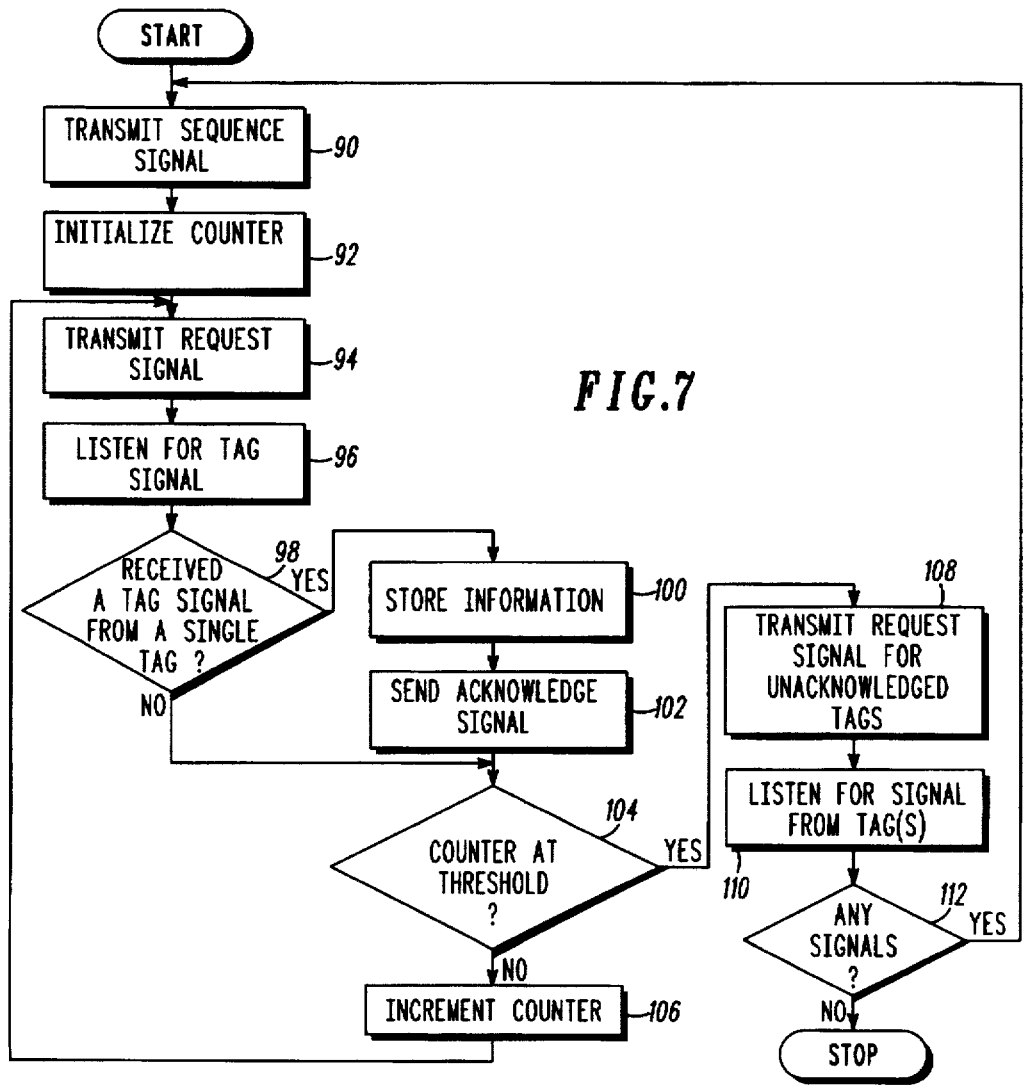
FIG. 7 is a flow chart of a method of communicating with a plurality of electronic tags.

FIG. 7 is a flow chart of a method of communicating with a plurality of electronic tags. This method can be utilized by the tag communicating device 32 to communicate with a plurality of food storage apparatus, each having a corresponding electronic tag 30 associated therewith, within the storage place 24. The communication can be performed to determine which food items are within the storage place 24, and to communicate information between the electronic tags 30 and the tag communicating device 32.

As indicated by block 90, the method includes a step of transmitting a sequence signal to a plurality of electronic tags. The sequence signal can be transmitted using the transmitter 86 in the tag communicating device 32 described with reference to FIG. 6. The sequence signal is utilized by each of the electronic tags to determine its position in a sequence for communicating with the tag communicating device 32. In a preferred embodiment, the sequence signal includes a representation of a sequence length which allows each electronic tag 30 to randomly determine its position within the sequence. The sequence length may be selected in dependence upon the capacity of the food storage apparatus.

As indicated by block 92, a step of initializing a counter is performed. The counter indicates the current position in the communication sequence. The counter is typically initialized using the processor 80 and stored within either the processor 80 or the memory 82.

As indicated by block 94, a step of transmitting a request-for-information signal is performed. The request-for-information signal requests the electronic tag 30 having the current position in the sequence to transmit information to the tag communicating device 32. The request-for-information signal can be transmitted using the transmitter 86.

As indicated by block 96, a step of listening for a tag signal from one or more of the electronic tags is performed. The receiver 88 in the tag communicating device listens for tag signals from one or more of the electronic tags.

As indicated by block 98, a step of determining if a tag signal is received from a single electronic tag is performed. The processor 80 can be utilized to perform this step.

If a tag signal is received from a single electronic tag, then a step of storing information is performed as indicated by block 100. This step can include any combination of: (i) storing food item identification information encoded within the tag signal; (ii) storing a time duration encoded within the tag signal; (iii) storing a first time that the food item is detected within the storage place; (iv) updating a last time that the food item was detected within the storage place; and (v) storing at least one condition sensed by the at least one sensor 34 and encoded within the tag signal. Preferably, the information is written to the memory 82 of the tag communicating device 32.

To acknowledge the reception of the tag signal, a step of transmitting an acknowledge signal is performed as indicated by block 102. The acknowledge signal can be transmitted by the transmitter 86 in the tag communicating device 32. The acknowledge signal can contain encoded information to be stored in the electronic tag 30, or encoded information which generates an indication using the indicator 36. The encoded information can include, for example, a time duration, a first time that the food item is detected within the storage place, and/or a last time that the food item was detected within the storage place.

It As noted that a tag signal is not received if no tag signals were transmitted or if two or more tag signals were transmitted. If two or more tag signals were transmitted, a collision occurs whereby information may not be extractable from each tag signal.

Upon sending the acknowledge signal in block 102, or if a tag signal is not received from a single electronic tag in block 98, a step of determining if the counter has attained a predetermined threshold is performed, as indicated by block 104. The predetermined threshold is indicative of a predetermined sequence length, which is preferably contained within the sequence signal transmitted in the step indicated by block 100.

If the counter has not attained the predetermined threshold, then a step of incrementing the counter is performed, as indicated by block 106. Thereafter, flow of the method is directed back to block 94 to transmit another request signal to communicate with another electronic tag.

If the counter has attained the predetermined threshold, then steps are performed to determine whether information has been successfully received and stored from all of the electronic tags. First, a step or transmitting a request-for-unacknowledged-tags signal is performed by the transmitter 86, as indicated by block 108. The receiver 88 then listens for signals produced by any unacknowledged tags, as indicated by block 110. As indicated by block 112, the processor 80 performs a step of determining if a signal is received from an unacknowledged tag.

If a signal is received from an unacknowledged tag, then flow of the method is directed back to block 100 wherein a new sequence signal is transmitted. Preferably, the new sequence signal includes a representation of a shortened sequence length to communicate with the unacknowledged tags.

If no signals are received from unacknowledged tags, then the method of communicating with the electronic tags is completed.

Figure 8:
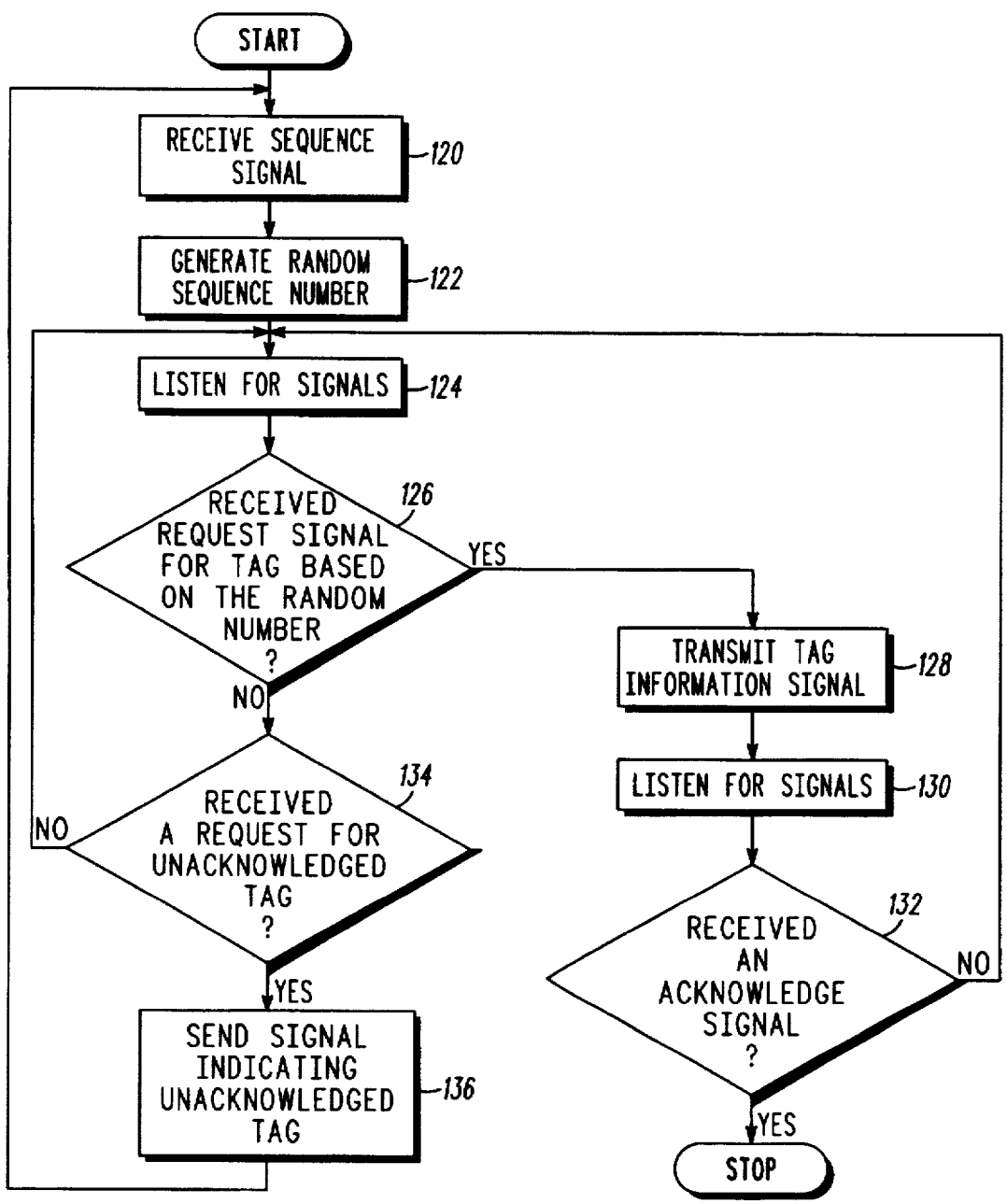
FIG. 8 is a flow chart of an embodiment of a method for an electronic tag to communicate with a tag communicating device.

FIG. 8 is a flow chart of an embodiment of a method for an electronic tag to communicate with a tag communicating device. As indicated by block 120, a step of receiving the sequence signal transmitted by the tag communicating device is performed. The step of receiving can be performed by the receiver 64 in the electronic tag 30 described with reference to FIG. 5. Preferably, the sequence signal includes a representation of an integer indicative of the predetermined sequence length.

As indicated by block 122, a step of generating a random number is performed to determine the position of the electronic tag in the communication sequence. The random number can be generated by the processor 62 In the electronic tag 30. Preferably, the random number is discrete and generated based upon a predetermined probability distribution (i.e. probability mass function or probability function). The probability distribution can be dependent upon the representation of the predetermined sequence length contained within the sequence signal. In one embodiment, the random number is representative of an integer from one to the sequence length. The random number is generated based upon a discrete uniform distribution wherein each of the integers from one to the sequence length is equally likely to be selected.

As indicated by block 124, the method includes a step of listening for signals transmitted by the tag communicating device. The step of listening can be performed using the receiver 74 in the electronic tag 30.

As indicated by block 126, a step of determining whether a request-for-information signal is received for the electronic tag based on the random number. The step of determining car: be performed using the processor 62. If a request-for-information signal is received for the electronic tag, then a step of transmittinq an information signal is performed as indicated by block 128. The information signal can encode any one or more of the food item identification information, a time duration, a first time that the food item is placed within the food storage apparatus, a last time the food item was within the storage place, conditions sensed by the at least one sensor 34, and a command to generate an indication using the indicator 40.

After transmitting the information signal, a step of listening for an acknowledge signal from the tag communicating device 32 is performed as indicated by the step of block 130. The step of listening for the acknowledge signal can be performed using the receiver 64.

As indicated by block 132, a step of determining whether an acknowledge signal is performed. If an acknowledge signal is received, then the information signal was successfully received by the tag communicating device 32, and execution of the method is completed. If an acknowledge signal is not received, or if an error signal is received, then flow of the method is directed back to block 124.

It is noted that a request-for-information signal is not received for the electronic tag in block 126 if a request-for-information signal is transmitted by the tag communicating device for another electronic tag, or if a request-for-unacknowledged-tags signal is transmitted.

If a request-for-information signal is not received for the electronic tag in block 126, then a step of determining whether a request-for-unacknowledged-tags signal is received is performed in block 134. If a request-for-unacknowledged-tags signal is not received, then flow of the method is directed back to block 124.

If a request-for-unacknowledged-tags signal is received, then a step of sending a signal indicating an unacknowledged tag is performed, as indicated by block 136. Flow of the method is then directed back to block 120 to receive another sequence signal.

Figure 9:
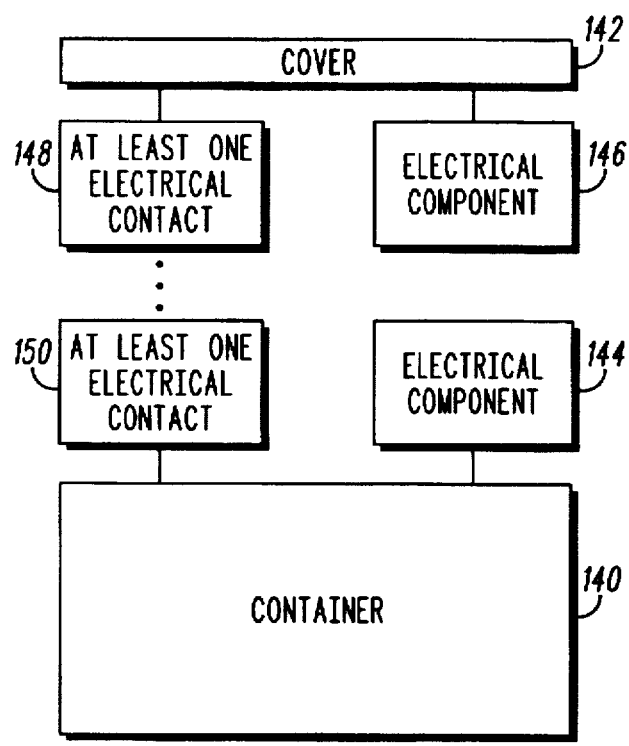
FIG. 9 is a block diagram of an embodiment of a food storage apparatus in accordance with the present invention.

FIG. 9 is a block diagram of an embodiment of a food storage apparatus in accordance with the present invention. The food storage apparatus includes a container 140, such as the container 26 described with reference to FIG. 1, for containing a food item. The food storage apparatus further includes a cover 142, such as the cover 28 described with reference to FIG. 1, for covering an opening of the container 140.

The food storage apparatus includes a first electrical component 144 and a second electrical component 146. The first electrical component 144 is associated with the container 140, and the second electrical component 146 is associated with the cover 142. The first electrical component 144 can be integrated with or attached to the container 140. Similarly, the second electrical component 140 can be integrated with or attached to the cover 142.

The first electrical component 144 communicates signals with the second electrical component 146 in accordance with at least one feature provided by the food storage apparatus. The signals communicated can include electrical signals, alternating current signals, direct current signals, electromagnetic signals, and/or radio frequency signals via a wireline or a wireless connection.

The first electrical component 144 and the second electrical component 146 can be selected from electronic components in the food storage apparatus 22 described with reference to FIG. 1, or the electronic components described with reference to FIG. 5. In addition, it is contemplated that the first and second electrical components 144, 146 may be any electronic device capable of carrying an electronic signal. Consequently, numerous embodiments can be formulated based on all possible two-set partitions of the aforementioned components. In a first embodiment, one of the electrical components 144 and 146 includes a sensor, and another of the electrical components 144 and 146 includes an indicator. In a second embodiment, one of the electrical components 144 and 146 includes an electronic tag, and another of the electrical components 144 and 146 includes an indicator. In a third embodiment, one of the electrical components 144 and 146 includes a sensor, and another of the electrical components 144 and 146 includes an electronic tag. In a fourth embodiment, one of the electrical components 144 and 146 includes at least one power-receiving terminal, and another of the electrical components 144 and 146 is powered via the power-receiving terminal when the first electrical component 144 and the second electrical component 146 communicate.

Alternatively, the first electrical component 144 and the second electrical component 146 can be selected from the various components of a portable fluid disinfection apparatus described in the copending "Portable Fluid Disinfection Apparatus" application incorporated by reference into the disclosure of the present invention. The first electrical component 144 and the second electrical component 146 can be selected from: a control circuit; an input device such as one or more switches, one or more buttons, a keypad, a knob, a dial, a touchpad, or a touchscreen; a sensor; an output device such as an audible indicator or a visual indicator; a power source including battery terminals, terminals for receiving an external power source, a solar cell, or a wind-up power source; and an ultraviolet source.

Optionally, the first electrical component 144 communicates with the second electrical component 146 when the cover 142 seals the opening of the container 140. This can be achieved by including at least one electrical contact 148 with the cover 142 to mate with at least one electrical contact 150 included with the container 140. When the cover 142 seals the opening of the container 140, the at least one electrical contact 148 mates with the at least one electrical contact 150 to provide an electrical coupling between the first electrical component 144 and the second electrical component 146.

Figure 10:
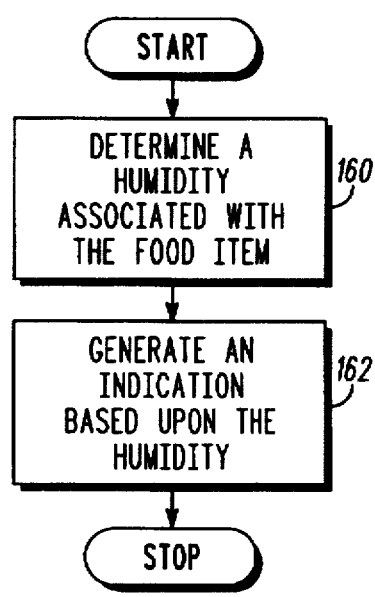
FIG. 10 is a flow chart of another embodiment of a method of monitoring a food item.

FIG. 10 is a flow chart of another embodiment of a method of monitoring a food item. As indicated by block 160, the method includes a step of determining a humidity within a food storage apparatus associated with the food item. The humidity can be sensed by a humidity sensor included in the at least one sensor 34 described with reference to FIG. 1.

As indicated by block 162, the method further includes a step of generating an indication based upon the humidity. The step of generating the indication can include generating an indication of a measure or the humidity and/or generating an indication if the humidity is outside of a predetermined range or beyond a predetermined threshold. With reference to FIG. 1, the indication can be generated by either the indicator 36, the indicator 40, or both. In a preferred embodiment, the indication is utilized to alert an individual of an undesirable humidity condition of the food item.

For long term storage, some have recommended that: carrots, beets, and cabbage should be maintained in an environment having a humidity of approximately 95% or more; potatoes should be kept in a slightly drier environment having a 90% humidity; and squash should be kept in an environment having a humidity of 70% to 75%. Using embodiments of the present invention, each of above-described food items can be stored in a respective food storage apparatus to monitor a respective humidity. Each food item is monitored by comparing its respective humidity to a respective humidity range selected therefor. An alert indication is generated if the humidity for a food item is outside of its range.

Thus, there has been described herein several embodiments including preferred embodiments of a food storage apparatus and methods and systems for monitoring a food item.

Because the various embodiments of the present invention provide communication of signals between a cover and a container, they provide a significant improvement in that various functions provided by a food storage apparatus can be distributed therein. Additionally, the various embodiments of the present invention as herein-described monitor a condition of a food item to alert an individual of a discard condition of a food item requiring refrigeration.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A food storage apparatus comprising:
   a container for containing a food item, the container having an opening;
   a first electrical component associated with the container;
   a cover for covering the opening of the container; and
   a second electrical component associated with the cover;
   wherein the first electrical component is in electrical communication with the second electrical component to monitor the food item.

2. The food storage apparatus of claim 1 wherein the first electrical component and the second electrical component communicate when the cover seals the opening of the container.

3. The food storage apparatus of claim 1 wherein the cover includes a first at least one electrical contact and the container includes a second at least one electrical contact to provide an electrical coupling between the first electrical component and the second electrical component when the cover seals the opening of the container.

4. The food storage apparatus of claim 1 wherein one of the first electrical component and the second electrical component includes a sensor, and wherein another of the first electrical component and the second electrical component includes an indicator.

5. The food storage apparatus of claim 1 wherein one of the first electrical component and the second electrical component includes at least one of a receiver, a transmitter, a processor, and a memory, and wherein another of the first electrical component and the second electrical component includes an indicator.

6. The food storage apparatus of claim 1 wherein one of the first electrical component and the second electrical component includes at least one of a receiver, a transmitter, a processor, and a memory.

7. The food storage apparatus of claim 1 wherein the container is sized for carrying by an individual.

8. The food storage apparatus of claim 1 wherein the container has a capacity less than or equal to 10 liters.

9. The food storage apparatus of claim 1 wherein at least one of the first electrical component and the second electrical component includes one of a temperature sensor, a humidity sensor, and an acidity sensor.

10. A method of monitoring a food item comprising the steps of:
    determining a time duration that the food item is outside of a storage place; and
    generating an indication based on the time duration.

11. The method of claim 10 wherein the storage place refrigerates the food item.

12. The method of claim 10 wherein the step of determining the time duration includes the steps of:
    determining a first time at which the food item is removed from the storage place;
    determining a second time at which the food item is returned to the storage place; and
    determining the time duration based upon the first time and the second time.

13. The method of claim 12 wherein the step of determining the first time includes the steps of:
    prior to the first time, establishing communication between a tag communicating device and an electronic tag associated with the food item when the food item is within the storage place; and
    detecting a loss of communication between the tag communicating device and the electronic tag when the food item is removed from the storage place;
    wherein the first time is based upon a time at which the loss of communication is detected.

14. The method of claim 13 wherein the step of determining the second time includes reestablishing communication between the tag communicating device and the electronic tag after the food item is returned to the storage place, wherein the second time is based upon a time at which communication is reestablished.

15. The method of claim 10 wherein the time duration is determined using an electronic tag associated with the food item.

16. The method of claim 15 wherein the electronic tag is included in a food storage apparatus for containing the food item.

17. The method of claim 16 wherein the indication is generated by an indicator associated with one of the food storage apparatus and the storage place.

18. A system for monitoring a food item, the system comprising:
    a receiver which receives a signal associated with a temperature proximate to the food item;
    a processor which determines a time duration that the temperature is beyond a predetermined temperature threshold; and
    an indicator to generate an indication based upon the time duration.

19. The system of claim 18 wherein the signal is received from a food storage apparatus for containing the food item, the food storage apparatus having a temperature sensor to sense the temperature proximate to the food item.

20. A system for monitoring a food item, the system comprising:
    a processor to determine a first time at which the food item is removed from a storage place, to determine a second time at which the food item is returned to the storage place, and to determine the time duration based upon the first time and the second time; and
    an indicator to generate an indication based upon the time duration.

21. A food storage apparatus for monitoring a food item, the food storage apparatus comprising:
    a container for containing the food item; and
    an electronic tag which communicates with a tag communicating device to determine a time duration that the food item is outside of a temperature controlled storage place.

22. The food storage apparatus of claim 21 further comprising an indicator which generates an indication of the time duration.

23. The food storage apparatus of claim 21 wherein the electronic tag communicates with the tag communicating device to determine the time duration by determining a first time at which the food item is removed from the storage place, determining a second time at which the food item is returned to the storage place, and determining the time duration based upon the first time and the second time.

24. A method of monitoring a food item, the method comprising the steps of:
    establishing communication between a tag communicating device and an electronic tag associated with the food item;

detecting a loss of communication between the tag communicating device and the electronic tag;

reestablishing communication between the tag communicating device and the electronic tag;

determining a time duration between a first time at which the loss of communication is detected and a second time at which communication is reestablished; and generating an indication based upon the time duration.

25. The method of claim 24 wherein communication between the tag communicating device and the electronic tag is established when the food item is placed to a storage place, wherein the loss of communication between the tag communicating device and the electronic tag is detected when the food item is removed from the storage place, and wherein communication between the tag communicating device and the electronic tag is reestablished when the food item is returned to the storage place.

26. A system for monitoring a food item, the system comprising:

a tag communicating device to establish communication with an electronic tag associated with the food item, to detect a loss of communication with the electronic tag, and to reestablish communication with the electronic tag, the tag communicating device having a processor to determine a time duration between a first time at which the loss of communication is detected and a second time at which communication is reestablished; and an indicator responsive to the processor to generate an indication based upon the time duration.

27. The system of claim 26 wherein communication between the tag communicating device and the electronic tag is established when the food item is placed to a storage place, wherein the loss of communication between the tag communicating device and the electronic tag is detected when the food item is removed from the storage place, and wherein communication between the tag communicating device and the electronic tag is reestablished when the food item is returned to the storage place.

* * * * *